（12） United States Patent
Tsao et al.

(10) Patent No.: US 11,320,102 B2
(45) Date of Patent: May 3, 2022

(54) BATTERY-POWERED POOL LIGHT ASSEMBLY

(71) Applicant: LED Power, Inc., Irvine, CA (US)

(72) Inventors: Chia-Tsung Tsao, Taoyuan (TW); Cary Aberg, Irvine, CA (US); Judy Kastner, Irvine, CA (US)

(73) Assignee: LED POWER, INC., Irvine, CA (US)

( * ) Notice: Subject to any disclaimer, the term of this patent is extended or adjusted under 35 U.S.C. 154(b) by 0 days.

(21) Appl. No.: 17/146,368

(22) Filed: Jan. 11, 2021

(65) Prior Publication Data

US 2021/0215309 A1  Jul. 15, 2021

Related U.S. Application Data

(60) Provisional application No. 62/959,842, filed on Jan. 10, 2020.

(51) Int. Cl.
*F21S 9/02* (2006.01)
*H02J 50/10* (2016.01)
*H02J 7/02* (2016.01)
*H02J 50/80* (2016.01)
*H02J 7/00* (2006.01)
*F21Y 115/10* (2016.01)
*F21W 131/401* (2006.01)

(52) U.S. Cl.
CPC ............. *F21S 9/02* (2013.01); *H02J 7/00032* (2020.01); *H02J 7/0042* (2013.01); *H02J 7/02* (2013.01); *H02J 50/10* (2016.02); *H02J 50/80* (2016.02); *F21W 2131/401* (2013.01); *F21Y 2115/10* (2016.08)

(58) Field of Classification Search
CPC ...... F21S 9/02; F21S 9/00; H02J 50/80; H02J 50/10; H02J 7/00032; H02J 7/0042; H02J 7/02; F21Y 2115/10; F21W 2131/401; F21L 4/00; F21L 4/08; F21V 17/00; F21V 17/105; F21V 21/096; F21V 21/08
See application file for complete search history.

(56) References Cited

U.S. PATENT DOCUMENTS

2011/0222272 A1*  9/2011  Yeh ........................... F21S 4/00
                                                                362/183
2015/0050881 A1*  2/2015  Chen ....................... H02J 50/80
                                                                455/41.1

* cited by examiner

*Primary Examiner* — Bao Q Truong
(74) *Attorney, Agent, or Firm* — Eleanor Musick; Torrey Pines Law Group PC

(57) ABSTRACT

A lighting system includes a light fixture assembly having a lower housing portion enclosing LED light circuitry, a rechargeable battery, a wireless communications module, and a system controller, and an upper housing portion enclosing a wireless charging receiver, a communication antenna, and a first set of magnets. A wireless charging assembly includes a wireless charging transmitter connected to a power source and a second set of magnets configured to releasably adhere to the first set of magnets to hold the charger housing against the fixture housing for charging. A wireless remote control application is used to control the lights within the fixture.

17 Claims, 10 Drawing Sheets

BATTERY-POWERED POOL LIGHT ASSEMBLY

RELATED APPLICATIONS

This application claims the benefit of the priority of Provisional Application No. 62/959,842, filed Jan. 10, 2020, which is incorporated herein by reference in its entirety.

FIELD OF THE INVENTION

The present invention relates to an LED lighting fixture for pools, spas, and other applications with a rechargeable battery power source.

BACKGROUND

Light fixtures are commonly installed in swimming pools and spas for safety and aesthetic reasons. Depending on the size and shape of the pool, multiple fixtures may be positioned at different locations around the pool, each installed in a niche cavity that is created in the wall or floor of the pool during the original concrete formation. Typical pool light fixtures include an incandescent or halogen flood lamp screwed into a conventional light socket, all sealed within a protective housing and lens to prevent water intrusion. The fixture must be firmly secured to the concrete of the wall or floor. The fixture is connected an external power source. In recent years, LED bulbs have become available to replace older, less energy-efficient lamps, also providing greater longevity.

Improper installation or poor maintenance of pool lighting fixtures and/or their electrical systems can expose pool users to a risk of electrocution. Some industry advocates have called for a move to low-voltage lighting only, but that would apply only to new pool construction. Owners of older pools and spas could choose to re-configure their lighting to a low-voltage system, however, the expense of rewiring the fixtures could discourage many pool owners from such an upgrade, especially if the rewiring process requires pool decking or other concrete structures to be cut to install the new connections.

An alternative to the expense, potential hazard, and ongoing maintenance of built-in pool lighting is available in the form of aftermarket battery-powered LED light fixtures, which can be hung on the pool ladder or wall using a suction cup, adhesive or magnets. Other commercially available LED pool lights are designed to float. Because these fixtures are battery-powered, they tend to be smaller and produce less light, but they also do not present an electrocution hazard. They also don't have the quality finished appearance and durability of a built-in fixture and are vulnerable to damage and/or loss during active play in the pool.

Existing systems fail to address the need for high quality, safe, versatile, aesthetically-pleasing, and easy to use lighting options for pools, spas and other applications. The present invention is directed to such a need.

BRIEF SUMMARY OF THE INVENTION

In an exemplary embodiment, the inventive light fixture system includes a light fixture assembly and a wireless charging assembly. The light fixture assembly has a fixture housing having two portions, the first fixture housing portion encloses LED light circuitry, a rechargeable battery, a remote communications module, and a system controller. The second fixture housing portion defines a charge pad and encloses a wireless charging receiver, a remote communication antenna and magnets. The wireless charging assembly includes a charger housing enclosing a wireless charging transmitter connected to a first end of a cable and magnets that are attracted to the magnets on the fixture housing to releasably hold the charge housing against the fixture housing for charging. The second end of the cable is connected to a DC power source which is connected to a voltage source such as a 120 VAC outlet or a solar power supply.

In an embodiment for installation in a pool or spa, the first fixture housing portion is a watertight enclosure dimensioned to be received and retained within a standard pool niche. A lens/filter and front cover seal the enclosure, with the back of the front cover flush against the pool wall. The second fixture housing portion extends above the first fixture housing portion separated by a neck portion allowing the charging assembly can be at least partially disposed above the water level for easy access for recharging.

In a preferred embodiment, the remote communications module is a wireless communications module that communicates with a remote wireless controller to activate operation options controlled by the system controller. In some embodiments, Bluetooth® wireless technology may be used. In a preferred embodiment, The LED circuitry includes an LED driver that drives an array of addressable white, red, green, and blue LEDs. Operation options selectable by the system controller may include selective activation of different combinations of LEDs within the array, such as color sequences, flashing, or dimming.

In some embodiments, the additional element of a gateway is included to boost communications between the remote communications module within the light fixture assembly and the remote wireless controller. The gateway may include an antenna, such as a long range, or LoRa, antenna, as is known in the art. The gateway further includes a Bluetooth® receiver, a transmitter module, e.g., a RoLa (wireless RF) transceiver module, and a micro control unit.

In one embodiment for underwater applications, the light fixture assembly includes six key elements that combine to provide the light source located within the main body of the housing (the first fixture housing portion): a rechargeable battery module, a battery management circuit unit, a wireless communications (e.g., Bluetooth®, LoRa, or similar) module, a micro control unit, an LED driver, and an LED circuit board. As will be readily apparent to those in the art, the exemplary Bluetooth® or LoRa modules are a well-known example of a wireless communications device— other wireless communications modules may be used. The smaller charging enclosure (the second fixture housing portion) is separated from the main body but electrically connected thereto and houses a wireless antenna, an LED indicator, a wireless charging receiver, and magnets. This enclosure is relatively flat and is configured to have a back surface that sits substantially flush against the wall of the pool with minimal extension from the wall. The wireless charger includes a wireless charging transmitter, and magnets housed within a waterproof box having dimensions generally matching those of the charging enclosure of the light fixture assembly. A cable extending from the wireless charger housing is connected at its distal end to a DC12V power source.

The magnets in both the fixture housing and the charger provide an easy means for aligning and releasably positioning the wireless charger for transmitting power to the fixture. Internally mounted magnets provide a smooth flat surface on the exterior of the housing that allows for good physical contact. Alternative means for releasably yet stably positioning the charger on the fixture for the duration of charging may include other types of releasable fasteners such as spring clips, snaps, tabs, a bracket or channel into which the charger slides, or other variations of releasable attachments.

The optional communications gateway facilitates communications between the light assembly and a remote control device, which may be a smart phone, tablet, or personal computer configured for wireless communications. The gateway includes an antenna to boost the wireless link between the assembly and the remote device.

The inventive light assembly is configured for wireless recharging. The rechargeable battery units saves costs of labor and time for both installation and maintenance, avoiding the need to hard wire the fixture to a power source.

There are two main components of the inventive system to complete wireless charging. The first is the wireless charging transmitter, i.e., "the charger", which has a cable running from the charger to a DC 12V power source. The second component is the wireless charging receiver. When the charger is in close proximity to the receiver, the magnets within their respective housings attract each other, guiding automatic alignment of the charger and receiver. Once the charger and receiver are aligned, electricity is transmitted to the receiver inductively and conducted through the conductor that extends from the charging enclosure to the battery management circuit within the main fixture housing.

The battery module and battery management circuit within the main fixture housing are configured for electricity storage and usage management. The battery module stores the electrical charge received from the charging receiver and supplies power to the LED circuitry and internal electrical components. The battery management circuit controls use of the battery power for efficiency and safety, with a goal of extending overall battery life.

The micro control unit (system controller) includes a single-chip microcomputer, which may be an ASIC, FPGA or other custom or off-the shelf controller for data processing, and a memory device for storage of data and operational instructions, which may include features that are controlled by a user app downloaded on a smart phone or other portable control device. The wireless communication module receives data and/or instructions from the smart phone and communicates with the micro control unit to generate instructions for output to the LED driver and LED circuit board for preset lighting commands. An LED indicator positioned near the charging receiver can be activated responsive to a signal from the battery management circuit and/or micro control unit to indicate a low batter condition. Other features and elements of the inventive system will be apparent from review of the drawings.

In one aspect of the invention, a lighting system includes a light fixture assembly having a fixture housing having two portions, the first fixture housing portion enclosing LED light circuitry, a rechargeable battery, a wireless communications module, and a system controller, and a second fixture housing portion enclosing a wireless charging receiver, a communication antenna, and a first releasable fastener; and a wireless charging assembly having a charger housing enclosing a wireless charging transmitter connected to a first end of a cable and a second releasable fastener configured to mate with the first releasable fastener to releasably hold the charge housing against the fixture housing for charging, wherein a second end of the cable is connected to a DC power source. In some embodiments, the first releasable fastener and second releasable fastener are magnets configured to attract each other. The fixture housing may further include a neck portion extending between the first fixture housing portion and the second fixture housing portion. The first fixture housing portion, the second fixture housing portion and the neck portion are sealed together to form a water-tight housing. In some embodiments, the communication antenna is disposed within an interior of the second fixture housing portion. The communication antenna may be extendable and retractable.

In some embodiments, the wireless communications module operates on a first wireless protocol and a remote device operates on a second wireless protocol, and the system further includes a gateway configured for communicating between the first wireless protocol and the second wireless protocol. The first wireless protocol may be Bluetooth while the second wireless protocol may be LoRa. The communication antenna may be configured for communication with a smart device which has an application stored therein for transmitting operational commands to the system controller. The first fixture housing portion is dimensioned to closely fit within a pool niche formed in a pool wall, wherein the second fixture housing portion extends above the pool niche in contact with the pool wall.

In another aspect of the invention, a lighting system includes a light fixture assembly having a fixture housing having two portions, a lower housing portion enclosing LED light circuitry, a rechargeable battery, a wireless communications module, and a system controller, and an upper housing portion enclosing a wireless charging receiver, a communication antenna, and a first set of magnets; a wireless charging assembly comprising a charger housing enclosing a wireless charging transmitter connected to a first end of a cable and a second set of magnets configured to releasably adhere to the first set of magnets to hold the charge housing against the fixture housing for charging, wherein a second end of the cable is connected to a DC power source; and a wireless remote control application. In some embodiments, the wireless communications module operates on a first wireless protocol and the wireless remote control application operates on a second wireless protocol, and the lighting system further includes a gateway configured for communicating between the first wireless protocol and the second wireless protocol. The first wireless protocol may be Bluetooth while the second wireless protocol may be LoRa. The wireless remote control application may be configured to operate on a smart device.

DETAILED DESCRIPTION OF EMBODIMENTS OF THE INVENTION

Figure 1:
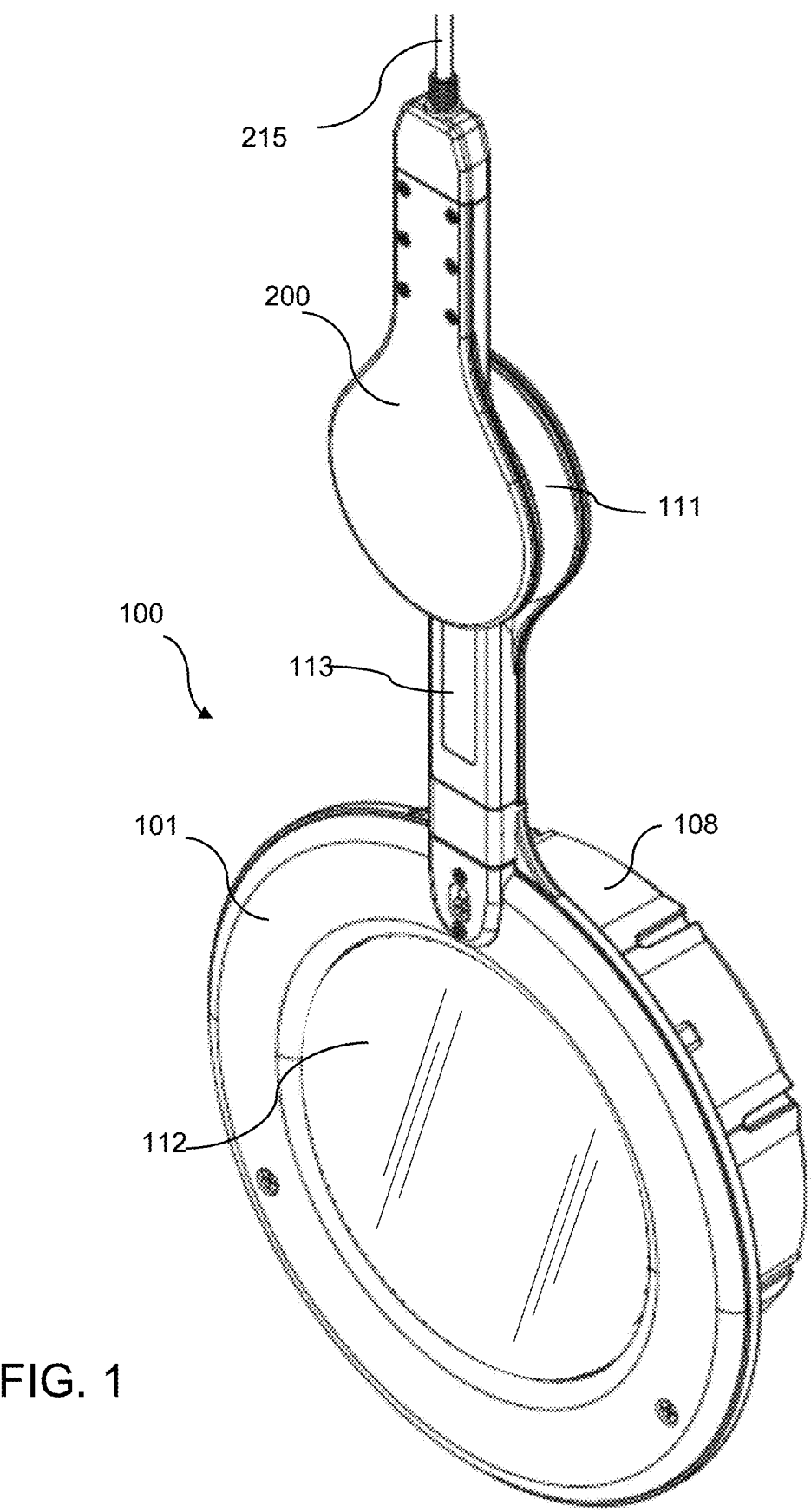
FIG. 1 is a front view of an embodiment the light fixture and wireless charger.
Figure 2:
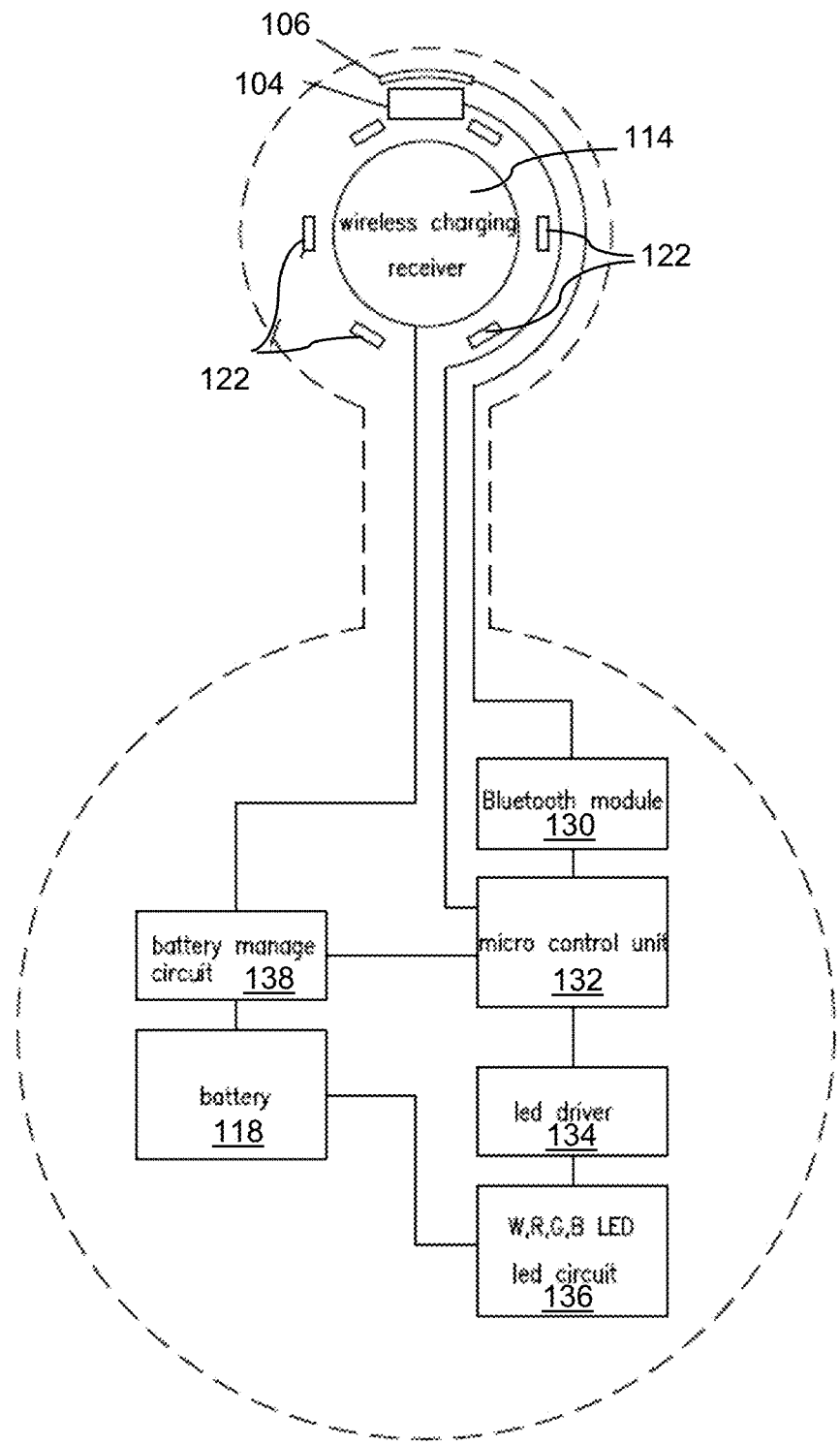
FIG. 2 is block diagrams of the basic elements of the light fixture according to an embodiment of the inventive system.

Referring to FIGS. 1 and 2, there are two main components of the inventive lighting system with wireless charging capability. In an exemplary embodiment, the inventive light fixture system includes a light fixture assembly 100 and a wireless charging assembly 200. The light fixture assembly 100 has a fixture housing having two portions separated by a neck 113. The first fixture housing portion 108, when assembled with lens 112 and frame 101, encloses LED light circuitry 132, 134, 138, a rechargeable battery module 118 (which may be either a single battery or a multi-battery pack), a remote communications module 130, and a system controller, micro control unit (MCU) 130. The second fixture housing portion at the upper end of neck 113 of the assembly, includes a charge pad 110 and encloses a wireless charging receiver 114, a remote communication antenna 106 and magnets 122. Exemplary electrical interconnections between the various elements are illustrated in FIG. 2 but not separately labeled.

Figure 4:
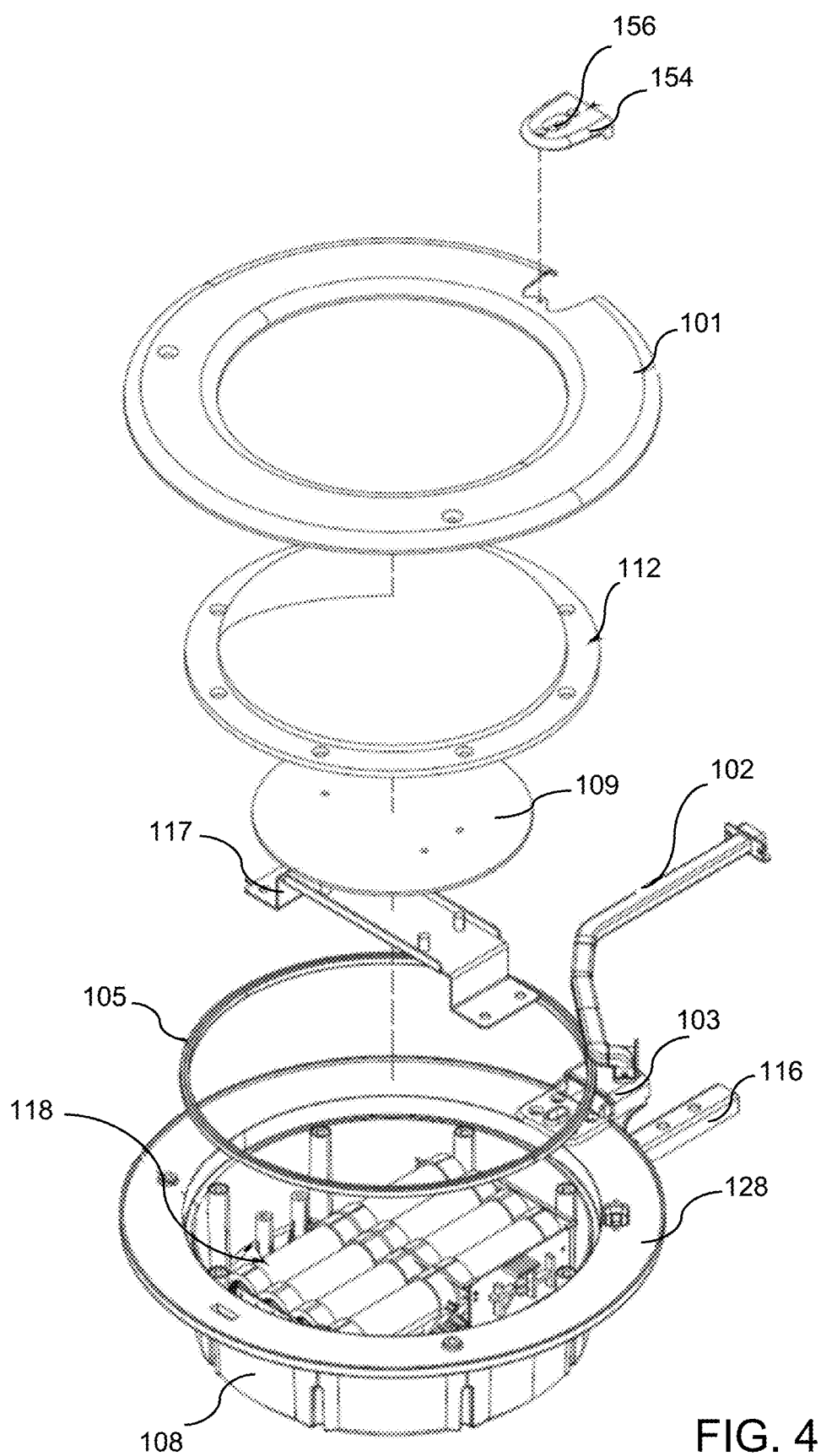
FIG. 4 is an exploded perspective view of the first fixture housing portion according to an embodiment of the light fixture

FIG. 4 illustrates further details of the assembly of the first fixture housing portion. Housing 108, which may be formed from polycarbonate, PVC or similar plastic or polymer, defines a cavity for retaining battery module 118 and appropriate supports and connectors. The flange 128 on housing 108 includes threaded bores for receiving fasteners to assemble the fixture components. Housing gasket 105, formed from silicone or similar material, is placed on top of the housing flange to produce a watertight seal when the fasteners are in place. Battery bracket 117 is attached to bosses formed within housing 108 and attached with screws to secure the batteries in place. The fixture may include different battery capacity options to increase output and extend time between charges. For example, in a first option, the battery module may be rated for 125 W-Hr, providing an operating time 25 hours and a charge time 12 hours. A second option can be for 250 W-Hr, with an operating time of 50 hours and a charge time 24 hours.

Printed circuit board (PCB) 109 sits on the upper face of bracket 117 and supports the LEDs and circuitry with appropriate interconnection and connectors. In a preferred embodiment, LED circuit includes white, red, green and blue LEDs to provide the fixture with a wide array of color options. Lens 112, formed from transparent polycarbonate, and frame 101, preferably formed from stainless steel, are attached to housing 108 by inserting screw fasteners through openings and into the threaded bores in the housing flange. Metal bar 116, preferably stainless steel, is attached via bracket 103 to extend radially from the flange of housing 108 to provide structural support for neck 113. A silicone tube 102 passes through the channel of stainless steel bracket 103, which is attached to the housing flange, to provide a conduit for cables running up the neck 113 to the second fixture housing portion.

Figure 5:
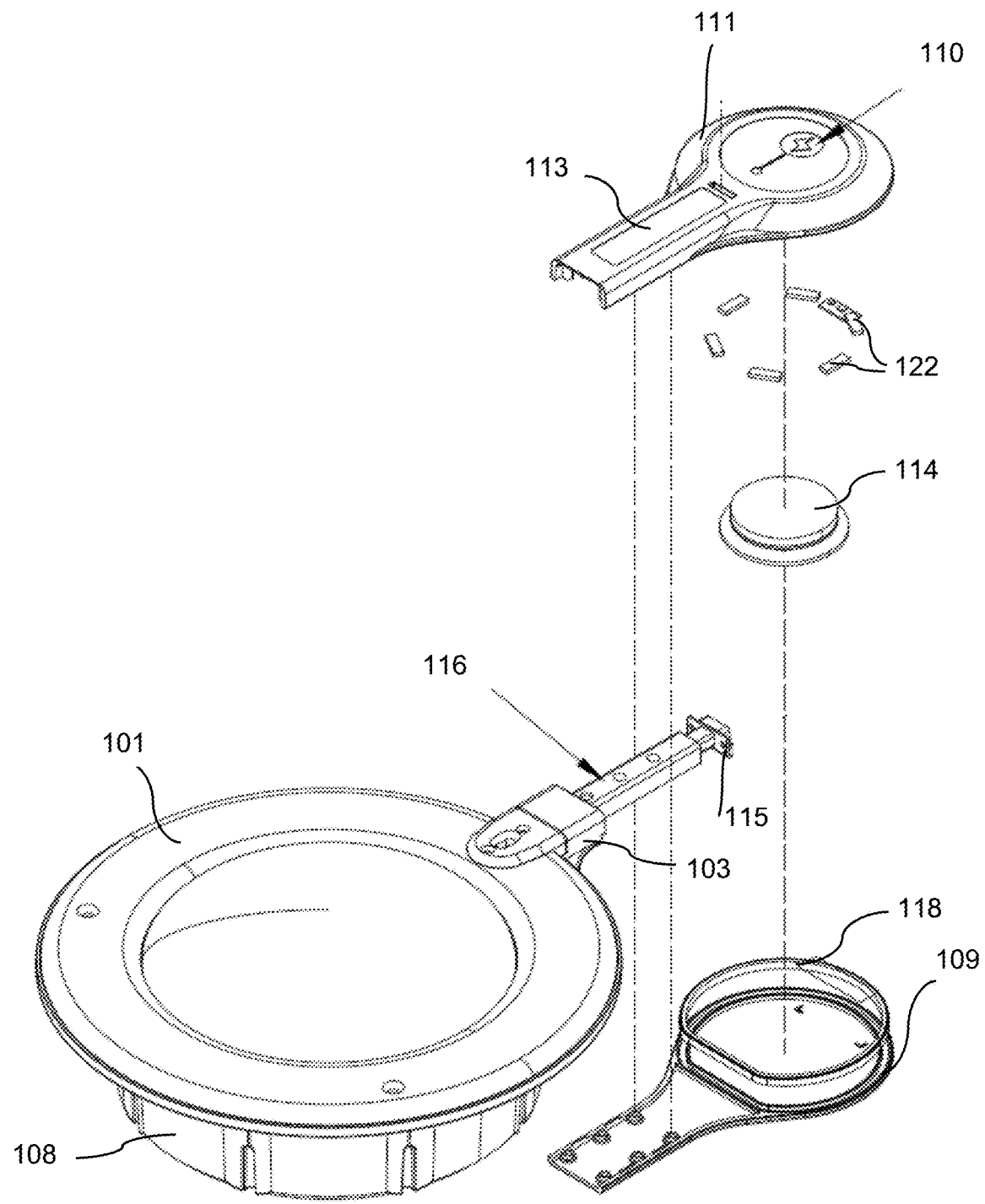
FIG. 5 is an exploded perspective view of the second fixture housing portion according to an embodiment.

FIG. 5 illustrates the components of the neck 113 and second fixture housing portion with charger pad 110. Charger pad housing top 111 and neck 113 are formed as a single piece from opaque polycarbonate, white or colored, or a similar plastic or polymer. Charger pad housing bottom 109, formed from the same material, is molded to match the shape of the top housing 111. Wireless charging receiver 114, metal bar 116, connector 115, antenna 106, and magnets 122 are sealed into the second fixture housing by sandwiching a gasket 107 between housing halves 111 and 109 and inserting screw fasteners through the bottom housing 109 into corresponding threaded bores in top housing 111. One or more LEDs 104 positioned near the charging receiver (shown in FIG. 2) may be connected to the MCU 132 to be activated responsive to a signal from the battery management circuit 138 to indicate battery status, such as a low battery condition. Cables and connectors within the assembly are preferably watertight.

Figure 3A:
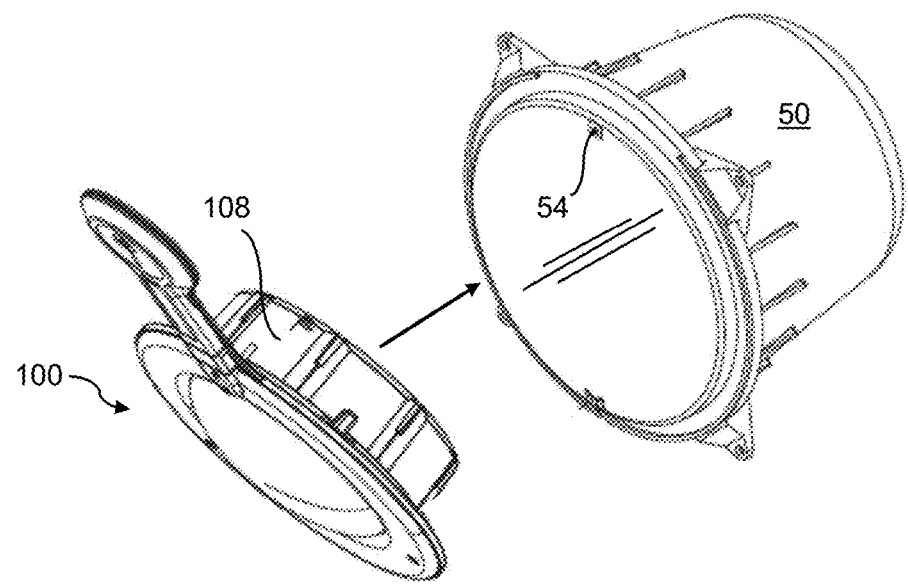
FIGS. 3A and 3B are perspective views of an embodiment of the light fixture prior to insertion and after insertion, respectively, into an existing niche.
Figure 3B:
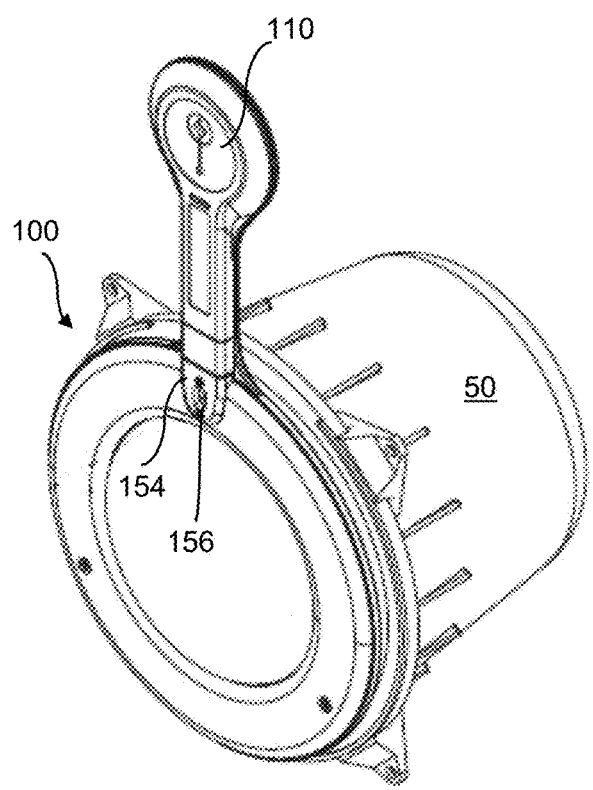
Figure 3C:
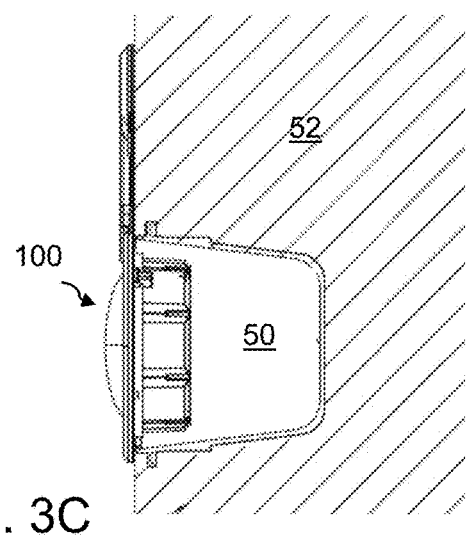
FIG. 3C is a side view of the fixture as installed.

Housing 108 is dimensioned to fit within a standard pool light niche, allowing easy replacement of a pre-existing conventional incandescent or halogen pool light with the wireless LED fixture described herein. Exemplary dimensions of the housing 108 are 272 mm (10.7") diameter×72 mm (2.83") deep. FIG. 3A illustrates a niche 50 prior to installation of a fixture 100. Cap 154 on fixture 100 has an opening 156 positioned to match up with corresponding openings in bracket 103, housing flange 128, and a tab 54 that extends inward from the edges of the niche opening. With the fixture 100 in place as shown in FIG. 3B, a screw fastener can be inserted through opening 156, bracket 103 and flange 128 to secure the fixture 100 to niche 50. FIG. 3C provides a side view, illustrating how the fixture 100 sits flush against the front face of the pool wall into which the niche is placed.

Figure 6A:
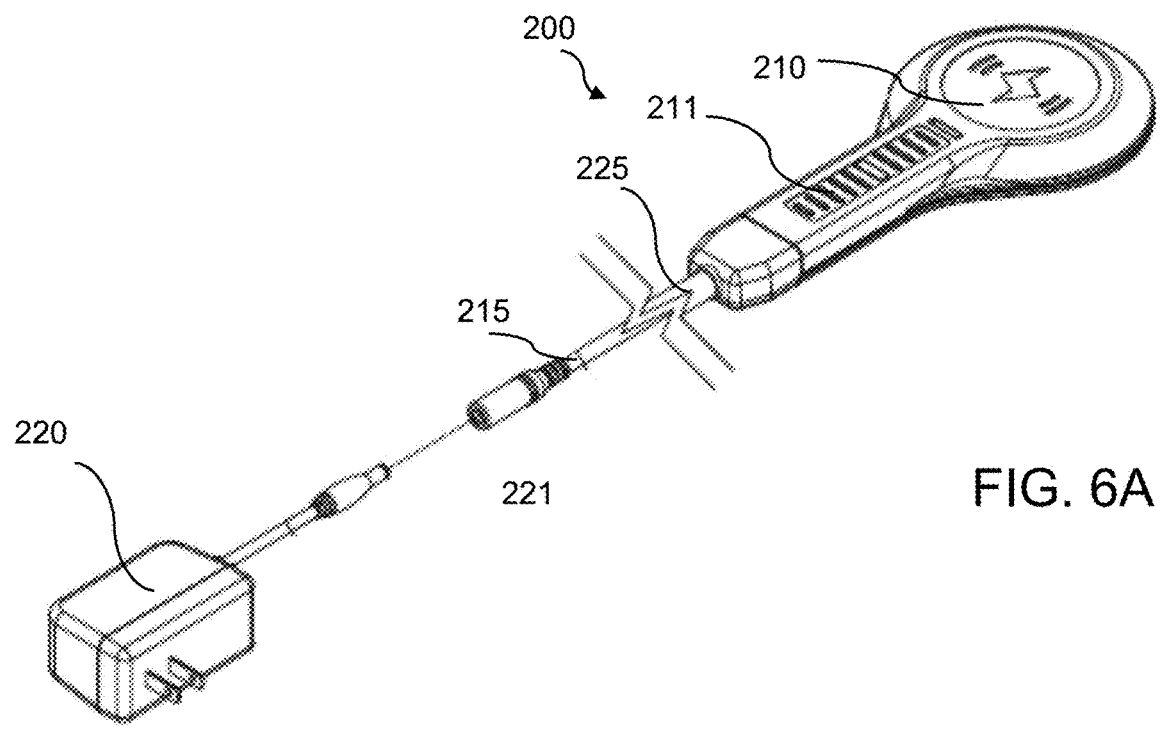
FIG. 6A is a perspective view of an embodiment of the charging assembly.
Figure 6B:
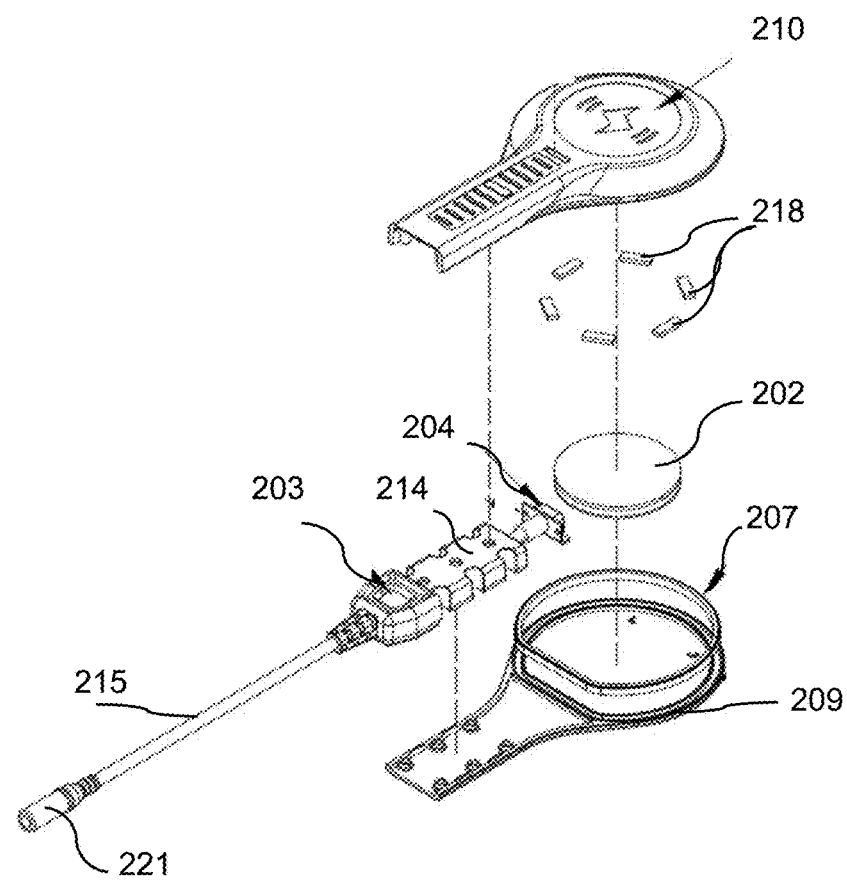
FIG. 6B is an exploded view of the charging assembly.
Figure 6C:
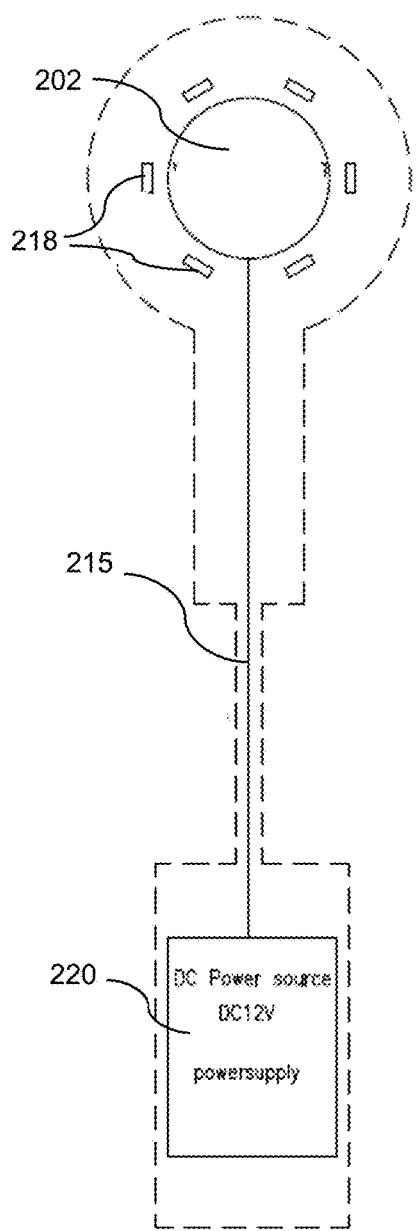
FIG. 6C is a block diagram of the basic elements of a charging assembly according to an embodiment.

Referring to FIGS. 6A-6C, the wireless charging assembly 200 includes a charger housing 210 enclosing a wireless charging transmitter 202 connected to a first end of a cable 215 and magnets 218 that are attracted to the magnets 122 on the fixture housing to releasably secure the charger housing 210 against the outer face of the second fixture housing 110 for charging of the battery module 118. The second end of the cable 215 is connected via connector 221 to a DC power source 220 which is connected to a voltage supply such as a 120 VAC outlet or a solar power supply.

Cable 215 may be incorporated into or fed through a PVC extender rod or tube 225 (rigid or semi-rigid) to facilitate handling of the charger to magnetically attach to the fixture's charging pad without requiring the user to submerge his or her hands in the water. In one embodiment, the extender tube 225, which will have a length on the order of 0.4 to 0.6 m (~15 to 20 in.) may be threaded to mate with a corresponding threaded fastener at the base of the charger housing.

The wireless charging assembly 200 utilizes components, materials and construction similar to that described for the lighting fixture. Cable 215 enters the body of the assembly through base connector 203, passes through internal support 214 to connect to wireless charging transmitter 202 at connector 204. Transmitter 202 is sandwiched between top housing 210, formed integrally with handle 211, and bottom housing 209. The housing is made watertight by placing silicone gasket 207 between the two halves, which are fastened together with screws inserted through bottom housing 209 into corresponding threaded bosses in the top housing. As illustrated, handle 211 may include ribs or knurled surfaces to facilitate handling. The housing sections are formed from polycarbonate or similar plastic or polymer. To ensure that all electrical supplies are at a safe distance from the pool, the cable 215 will preferably be relatively long. In an exemplary embodiment, the cable may be on the order of around 4 to 5 meters (~15-20 feet) long.

Figure 7:
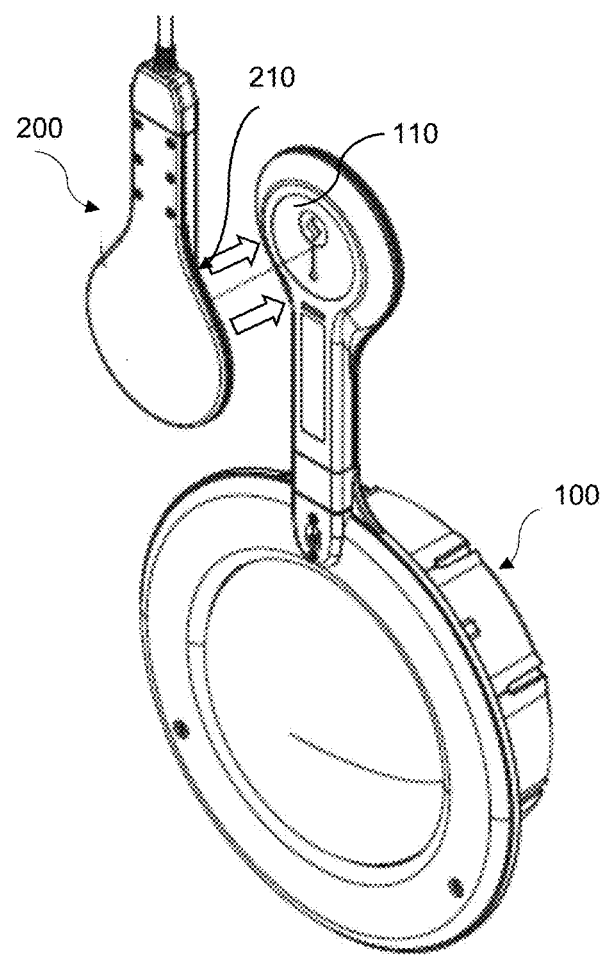
FIG. 7 is a perspective view showing the charger being positioned near the charge pad (receiver) of the fixture prior to contacting the charger to the fixture for recharging the fixture's batteries.

FIG. 7 illustrates the charging assembly 200 as positioned to approach the light fixture 100 to begin charging the fixture's battery. With the charger top housing 210 facing second fixture housing 110, the magnets 218 and 122 in the housings will draw the two surfaces together when in close enough proximity and will hold them in place during charging. Once the charger and receiver are aligned, electricity is transmitted to the receiver inductively and conducted through the conductor that extends from the charging enclosure to the battery management circuit 138 within the main fixture housing.

Referring again to FIG. 2, battery module 118 and battery management circuit 138 within the main fixture housing are configured for electricity storage and usage management. Battery module 118 stores the electrical charge received from the charging receiver 200 and supplies power to the LED circuitry, MCU 132 and communication components. The battery management circuit 138 controls use of the battery power for efficiency and safety, with a goal of extending overall battery life.

MCU 132 includes a single-chip microcomputer, which may be an ASIC, FPGA or other custom or off-the-shelf controller for data processing, and a memory device (integrated or separate components) for storage of data and operational instructions, which may include features that are controlled by a user application ("app") downloaded on a smart phone or other wireless control device. The wireless communications module 130 receives data and/or instructions from the app (described below) and communicates with the MCU 132 to generate instructions for output to the LED driver 134 and LED circuit board 136 for activating the lighting functions. Wireless communications module 132 may operate on any of a number of known, commercially-available wireless communications platforms including Bluetooth® (2.4 GHz), LoRa® (Long Range) (e.g., 865 MHz-915 MHz), LoRaWAN (Long Range Wide Area Network), SigFox, Zigbee, WiFi (e.g., 5 GHz), or other procotols that are appropriate for use in IoT applications. In an exemplary embodiment, a RoLa RF module using a LoRa® platform is used. With their relatively lower frequencies, LoRa® signals experience less attenuation in water than would a system operating at the Bluetooth® frequency.

Figure 8:
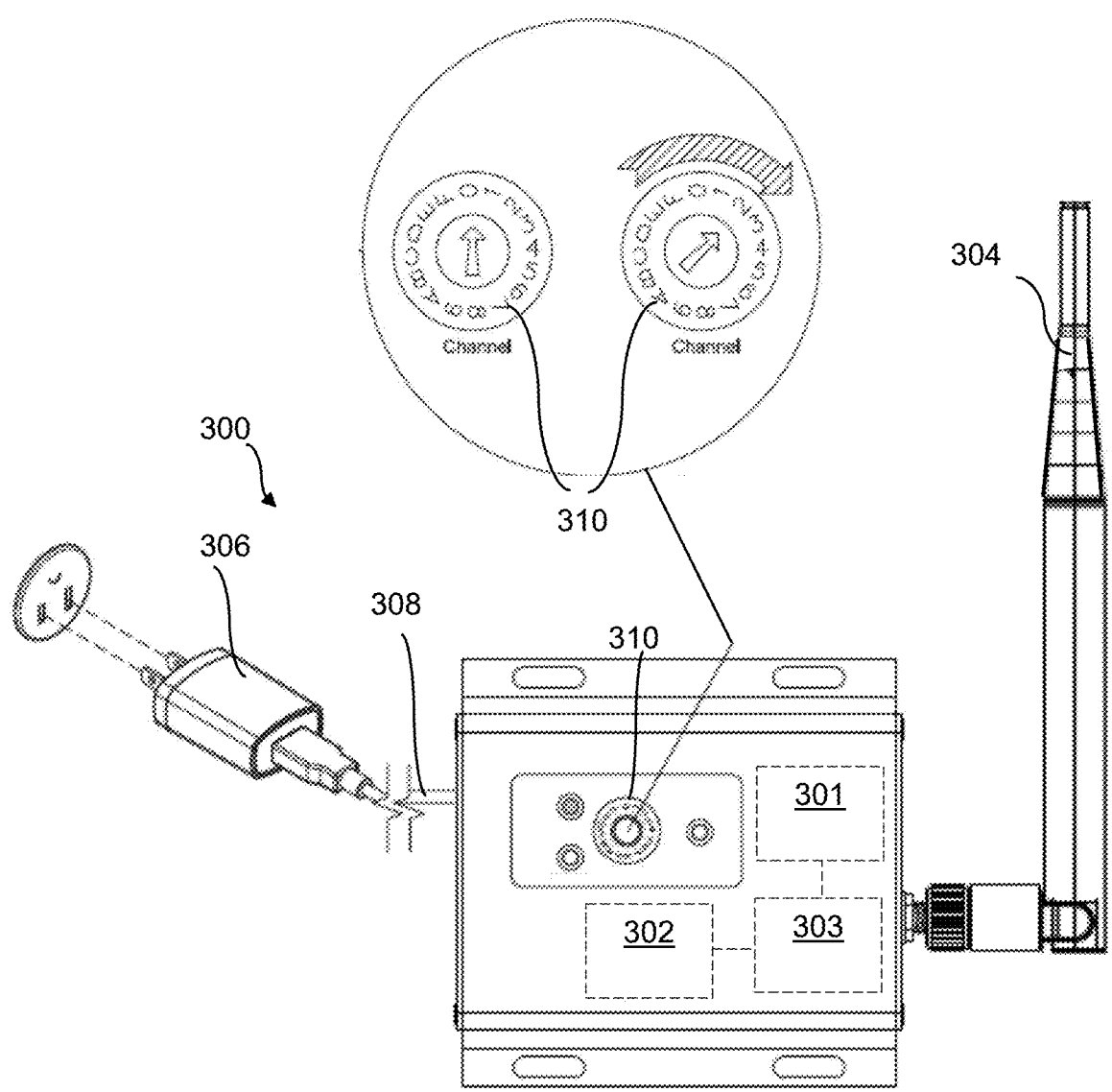
FIG. 8 is a diagrammatic view of the gateway communication assembly, where the inset illustrates the channel selector according to one embodiment.

In some embodiments, the inventive system includes a gateway to provide communications for remote operation of the lighting fixture. Gateways are widely used in many IoT applications. As shown in FIG. 8, gateway 300 includes a Bluetooth® receiver 301, a micro control unit (MCU) 302, a RoLa transmitter module 303, and a LoRa® antenna 304. MCU 302 processes the signal received from the remote device, e.g., smart phone, by the Bluetooth® receiver 301 for transmission by the RoLa transmitter 303 to the antenna 106 in lighting fixture 100. The signal received by antenna 106 is communicated via the RoLa receiver 130 to MCU 132 to control the lighting functions within the fixture. Gateway 300 is connected to a power supply 306 via cable 308. Because the gateway is not waterproof, it should be located in a sheltered or interior location that will not be subject to interference. Typical gateways include multiple channels. The selected channel may need to be changed in the event that interference occurs, or if multiple gateways are used to separately control different groups of lights in the same area.

If the channels are changed, the channels of the corresponding RoLa transmitter 303 and RoLa receiver 130 will need to be matched. Channel selector 310, shown enlarged in the inset, can be used to perform the required matching. Channel selection using selector 310 can be achieved by inserting a flathead screw driver tip into the slot and rotating the screwdriver to rotate the selector.

Referring briefly to FIG. 1, the charging receiver housing 110 is separated from the lamp housing portion by a neck 113, the length of which may be selected to determine the relative position of the overall assembly to the water level in the pool. (As specified by National Electrical Code (NEC), the position of underwater lights in a pool is at least 18 inches below normal water level.) For embodiments of the invention that use Bluetooth® transmission only, i.e., without a gateway, the frequency employed for Bluetooth® communications is known to be attenuated by water. In this case, the length of the neck portion may be selected to position at least a portion of the charging receiver box, which includes the Bluetooth® antenna, above the water level. This would result in the neck portion being at least 18 inches long. Since it has a shallow profile, this should not present a significant design problem since it will be tightly held against the side of the pool. In some variations, the charger receiving box can be configured with a decorative or whimsical appearance, for example, a stylized fish, a seashell, or a star, so that the charger receiving box is aesthetically pleasing.

Figure 9:
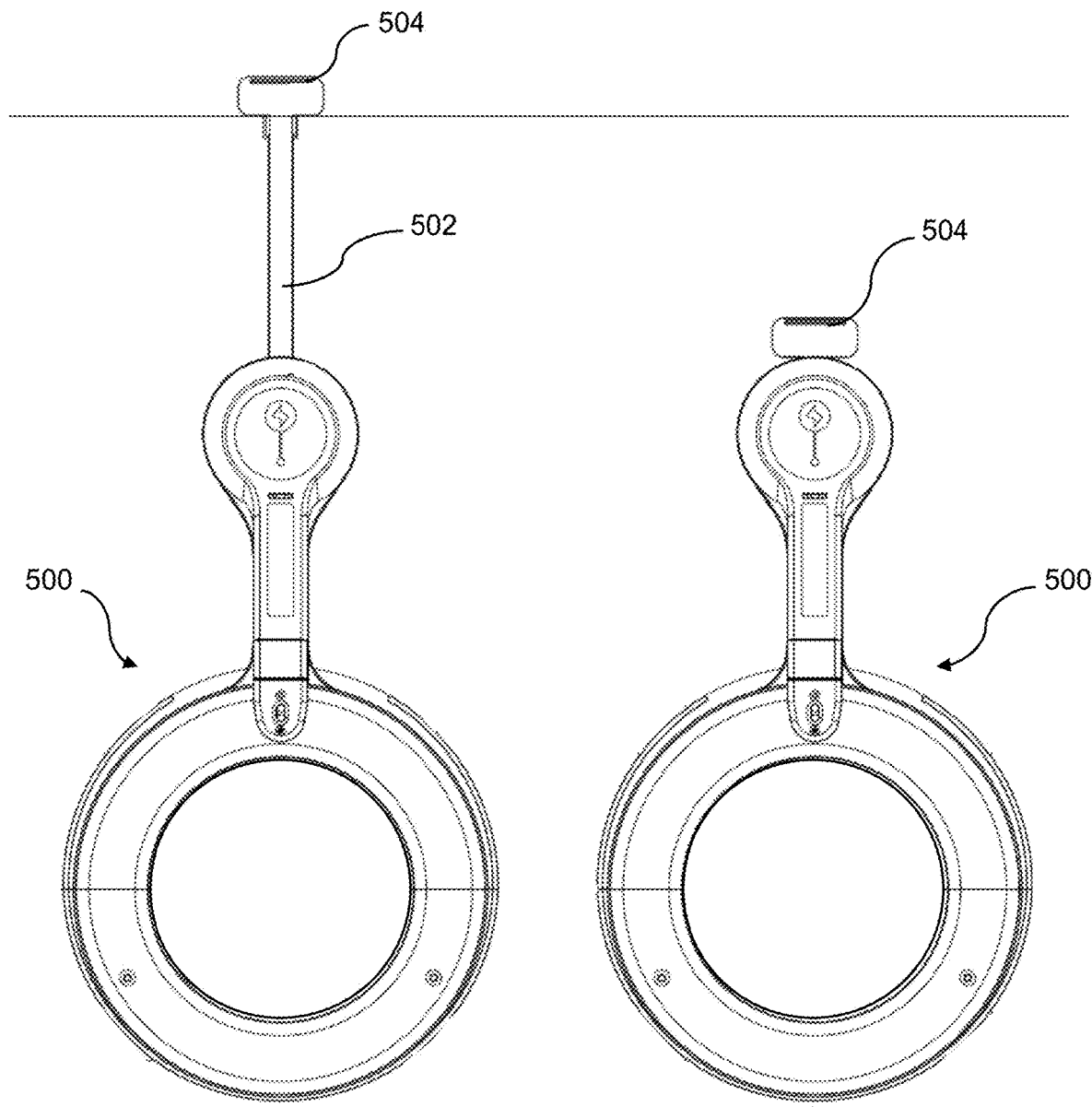
FIG. 9 provides front plan views of an embodiment of the inventive lighting fixture with an extendable/retractable antenna for wireless communications, showing the antenna extended (left) and retracted (right).

As an alternative to a longer fixed neck dimension, FIG. 9 illustrates an embodiment of the lighting fixture 500 in which an extendable Bluetooth® antenna 504 is attached to the charging receiver box of the fixture by way of a sliding or telescoping antenna stem 502 that is retained within a channel on the back side of the neck and charging receiver box. The antenna wire/cable is retained within the rigid protective flat antenna stem that slides up (left image) and down (right image) guided by guide brackets disposed near the top of the charging receiver box and at the base of the neck portion. The conductors between the antenna and the wireless (Bluetooth®) module within the lower housing are protected behind the neck portion and sealed with appropriate waterproof seals. The extendable antenna 504 adds sufficient length to the overall assembly to allow the antenna's receiver to be positioned above the normal water level in the pool.

Figure 10:
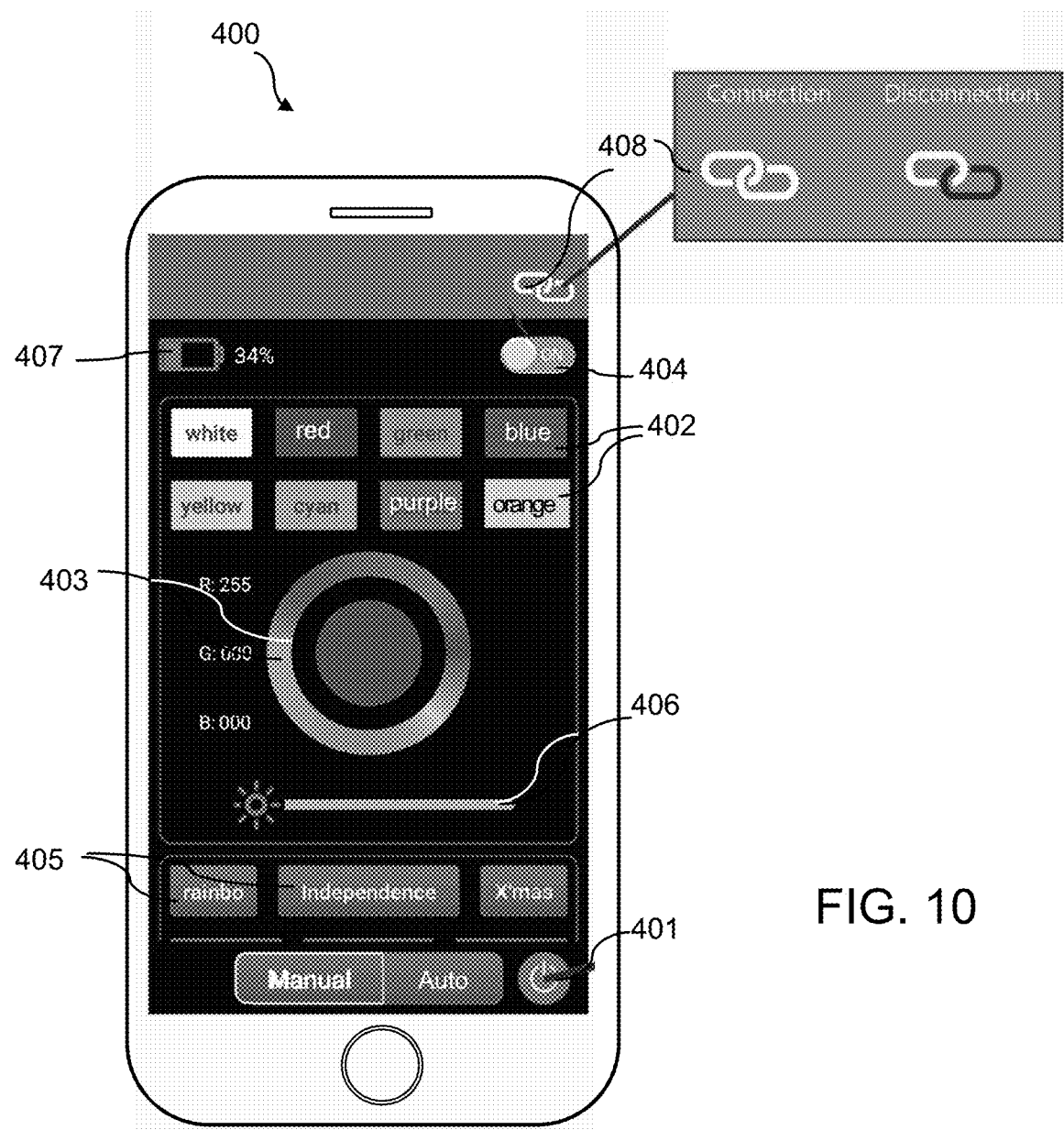
FIG. 10 shows an exemplary screen shot of an app as displayed on a smart phone as a remote control device according to an embodiment of the invention.

In an exemplary embodiment, a smart phone (or other smart device) application may be provided to remotely control operation of the lighting fixture. Typically, this will involve the use of that device's build-in Bluetooth® feature. Referring to FIG. 10, in an exemplary embodiment, the smart phone application, which is downloaded to and run on a smart phone 400, communicates via a standard Bluetooth® protocol. Control features of the application may be selected using the smart device's touch screen including remote activation via on/off button 404, selection of LED colors, including preset color buttons 402, which may be activated alone or in combinations, or a color wheel 403 to select different levels of R, G and B combinations. Fading or dimming can be controlled by swiping on slide 406. Additional features may include manual or automatic settings with pre-programmed LED activation sequences, such as "rainbow", "Independence Day" or "Christmas", by selecting one of buttons 405. The lighting controller app may also include a battery charge indicator 407 to display the lighting system's battery level on the device screen, allowing the user to plan when recharging will be required or respond to a low battery condition without directly viewing the indicators on the light fixture. Other additional features may include a separate on/off button 401 that allows for the entire system to be deactivated using the remote device, and a link indicator 408 that displays information to notify the user if the link between the remote device and the gateway has been disconnected.

As an alternative to a smart phone application, remote operation may be enabled via WiFi and a smart home device such as Amazon Echo, Google Home, or similar system. For purposes of the present disclosure, the term "smart device" includes smart phones and tablets, smart home devices, and similar devices commonly used for wireless communication.

As will be readily apparent to those in the art, different materials may be used and selection of appropriate materials will depend on the intended application. For example, the listed materials are selected for use in a swimming pool or spa installation. Different materials may be appropriate for an installation that does not involve continuous submersion under water, for example, in outdoor lighting applications including street and environmental lighting. Still other materials may be used in applications for use in saltwater, more corrosive environments, or in locations where the fixture could potentially be subjected to potentially damaging physical forces. One example could be a dock or boat mooring. Selection of appropriate materials for a specific application of the system will be within the level of skill in the art.

The invention claimed is:

1. A lighting system comprising:
 a light fixture assembly comprising a fixture housing having two portions, the first fixture housing portion enclosing LED light circuitry, a rechargeable battery, a wireless communications module, and a system controller, and a second fixture housing portion enclosing a wireless charging receiver, a communication antenna, and a first releasable fastener; and
 a wireless charging assembly comprising a charger housing enclosing a wireless charging transmitter connected to a first end of a cable and a second releasable fastener configured to mate with the first releasable fastener to releasably hold the charger housing against the fixture housing for charging, wherein a second end of the cable is connected to a DC power source.

2. The lighting system of claim 1, wherein the first releasable fastener and second releasable fastener are magnets configured to attract each other.

3. The lighting system of claim 1, wherein the fixture housing further comprises a neck portion extending between the first fixture housing portion and the second fixture housing portion.

4. The lighting system of claim 3, wherein the first fixture housing portion, the second fixture housing portion and the neck portion are sealed together to form a water-tight housing.

5. The lighting system of claim 1, wherein the communication antenna is disposed within an interior of the second fixture housing portion.

6. The lighting system of claim 1, wherein the communication antenna is extendable and retractable.

7. The lighting system of claim 1, wherein the wireless communications module operates on a first wireless protocol and a remote device operates on a second wireless protocol, and further comprising a gateway configured for communicating between the first wireless protocol and the second wireless protocol.

8. The lighting system of claim 7, wherein the first wireless protocol is Bluetooth.

9. The lighting system of claim 7, wherein the second wireless protocol is LoRa.

10. The lighting system of claim 1, wherein the communication antenna is configured for communication with a smart device.

11. The lighting system of claim 10, wherein the smart device has an application stored therein for transmitting operational commands to the system controller.

12. The lighting system of claim 1, wherein the first fixture housing portion is dimensioned to closely fit within a pool niche formed in a pool wall, wherein the second fixture housing portion extends above the pool niche in contact with the pool wall.

13. A lighting system comprising:
 a light fixture assembly comprising a fixture housing having two portions, the first fixture housing portion enclosing LED light circuitry, a rechargeable battery, a wireless communications module, and a system controller, and a second fixture housing portion enclosing a wireless charging receiver, a communication antenna, and a first set of magnets;
 a wireless charging assembly comprising a charger housing enclosing a wireless charging transmitter connected to a first end of a cable and a second set of magnets configured to releasably adhere to the first set of magnets to hold the charger housing against the fixture housing for charging, wherein a second end of the cable is connected to a DC power source; and
 a wireless remote control application configured for controlling operation of the LED light circuitry.

14. The lighting system of claim 13, wherein the wireless communications module operates on a first wireless protocol and the wireless remote control application operates on a second wireless protocol, and further comprising a gateway configured for communicating between the first wireless protocol and the second wireless protocol.

15. The lighting system of claim 14, wherein the first wireless protocol is Bluetooth.

16. The lighting system of claim 14, wherein the second wireless protocol is LoRa.

17. The lighting system of claim 13, wherein the wireless remote control application is configured to operate on a smart device.

\* \* \* \* \*